United States Patent
Bielitz et al.

(10) Patent No.: US 11,219,821 B2
(45) Date of Patent: Jan. 11, 2022

(54) ANALOG VOLTAGE BASED COMPUTING DEVICE INPUT SYSTEM

(71) Applicant: Microsoft Technology Licensing, LLC, Redmond, WA (US)

(72) Inventors: George William Bielitz, Sammamish, WA (US); Ross Anthony Nelson, Seattle, WA (US); Sam Michael Sarmast, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 416 days.

(21) Appl. No.: 15/867,592

(22) Filed: Jan. 10, 2018

(65) Prior Publication Data

US 2019/0176028 A1 Jun. 13, 2019

Related U.S. Application Data

(60) Provisional application No. 62/596,110, filed on Dec. 7, 2017.

(51) Int. Cl.
*A63F 13/24* (2014.01)
*A63F 13/22* (2014.01)
*G06F 13/38* (2006.01)
*G06F 13/42* (2006.01)

(52) U.S. Cl.
CPC .............. *A63F 13/24* (2014.09); *A63F 13/22* (2014.09); *G06F 13/385* (2013.01); *G06F 13/4282* (2013.01); *G06F 2213/0042* (2013.01)

(58) Field of Classification Search
CPC ........ A63F 13/24; A63F 13/00; G06F 13/385; G06F 13/4285
See application file for complete search history.

(56) References Cited

U.S. PATENT DOCUMENTS

| | | | |
|---|---|---|---|
| 6,078,311 A * | 6/2000 | Pelkey | G06F 3/0383 345/161 |
| 6,101,560 A | 8/2000 | Gulick | |
| 6,618,774 B1 * | 9/2003 | Dickens | G06F 13/385 174/19 |
| 8,171,322 B2 | 5/2012 | Fiennes et al. | |
| 8,192,234 B2 | 6/2012 | Wittenberg et al. | |

(Continued)

OTHER PUBLICATIONS

Raphy, "Adroit Switchblade 2 Controller Review: A do-it-all controller for disabled gamers Controllers", Published on: Jul. 21, 2015 http://gamingcontrollersforyou.com/adroit-switchblade-2-controller-review-a-do-it-all-controller-for-disabled-gamers (Year: 2015).*

(Continued)

*Primary Examiner* — William H Mcculloch, Jr.
*Assistant Examiner* — Ankit B Doshi
(74) *Attorney, Agent, or Firm* — Alleman Hall Creasman & Tuttle LLP (57) ABSTRACT

Examples are disclosed that relate to computing device input systems. In one example, a computing device input system comprises an input configured to receive a connection to a control device connector comprising a plurality of conductors. The computing device input system further comprises circuitry configured to determine a presence, type, and state of a control device in communication with the control device connector based on analog voltages received from the control device connector.

20 Claims, 11 Drawing Sheets

(56) References Cited

U.S. PATENT DOCUMENTS

| | | | |
|---|---|---|---|
| 9,180,364 B2 | 11/2015 | Pena et al. | |
| 9,736,567 B2* | 8/2017 | Keskin | H04R 1/1041 |
| 2007/0281828 A1* | 12/2007 | Rice | A63B 71/0622 |
| | | | 482/4 |
| 2016/0054876 A1 | 2/2016 | Robison | |
| 2018/0027330 A1* | 1/2018 | Rand | G06F 13/387 |
| | | | 381/309 |
| 2018/0056180 A1* | 3/2018 | Russell | A63F 13/23 |

OTHER PUBLICATIONS

Julian, "Switches Explained", Oct. 28, 2014, Aidis Trust Blog, http://blog.aidis.org/switches-explained (Year: 2014).*

Ryan Smoot, "Understanding Audio Jack Switches and Schematics", Oct. 10, 2017, CUI Devices, https://www.cuidevices.com/blog/understanding-audio-jack-switches-and-schematics (Year: 2017).*

"ApexRadio", Retrieved From <<https://web.archive.org/web/20130427035504/https:/www.universal-radio.com/catalog/sw_ant/16891026.html>>, Apr. 27, 2013, 1 Page.

"How To Connect Two Wire Speaker 3.5mm Jack Port with 3.5 Mm Audio Cable Wiring Diagram", Retrieved From <<http://gooddy.org/35-mm-audio-cable-wiring-diagram.html/how-to-connect-two-wire-speaker-3-5mm-jack-port-with-3-5-mm-audio-cable-wiring-diagram>>, Retrieved On: Nov. 17, 2017, 3 Pages.

"Using External Buttons for Photobooth Shooting", Retrieved From <<https://www.breezesys.com/NKRemote/help/index.html?using_external_buttons_for_pho.htm>>. Retrieved On: Nov. 17, 2017, 5 Pages.

Lynds, James S., "DARCI TOO—a computer input device for people with disabilities", In Journal of Johns Hopkins APL Technical Digest, vol. 13, No. 04, Feb. 1, 1992, pp. 496-498.

"International Search Report and Written Opinion Issued in PCT Application No. PCT/US2018/062377", dated May 7, 2019, 15 Pages.

* cited by examiner

ANALOG VOLTAGE BASED COMPUTING DEVICE INPUT SYSTEM

CROSS REFERENCE TO RELATED APPLICATIONS

This application claims priority to U.S. Provisional Application Ser. No. 62/596,110, filed Dec. 7, 2017, the entirety of which is incorporated by reference for all purposes.

BACKGROUND

Video game systems may be configured to receive inputs from a variety of input devices, including but not limited to buttons, triggers and joysticks. Often, multiple input devices are incorporated into a single handheld controller body.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

In one disclosed example, a computing device input system comprises an input configured to receive a connection to a control device connector comprising a plurality of conductors. The computing device input system further comprises circuitry configured to determine a presence, type, and state of a control device in communication with the control device connector based on analog voltages received from the control device connector.

DETAILED DESCRIPTION

Gaming is a critical social outlet for many people with disabilities. However, most gamers with disabilities must rely on expensive aftermarket control hardware, the vast majority of which are hand built, one-off solutions. These custom-tailored devices and rigs are difficult to find, require technical expertise, may suffer from reliability problems due to the rework necessary, and can be very costly.

Gamers with disabilities and their caregivers often do not know where to look for assistive tech input devices, and may not have the technical ability to set up assistive technology hardware solutions.

Non-profits specialized in assistive gaming tech may help gamers with disabilities and their caregivers, but may have limited resources (e.g., funding, expertise, time) which results in backlogs, with many gamers waiting for expensive rigs. Gamers with disabilities, their caregivers, and associated non-profits may benefit from an off-the-shelf solution that is customizable for their input needs and physical abilities.

Accordingly, examples are disclosed herein that relate to human interface devices (HIDs) that have expansion capabilities for users. The described examples may be adapted for use by anyone, but may have special resonance for users with disabilities by enabling low cost interfaces with which to design multi-use HID devices.

Examples also relate to hardware and firmware interfaces that allow for an ecosystem of HID peripherals to be created that may enable gamers and other users to use HID devices for game play, office use, and other computer applications and accessibilities for daily life.

Such a computing device input system may include multiple input ports that enable accessibility to computing devices for people with disabilities, in particular for people with limited mobility, allowing them to couple joysticks, triggers, etc. that work for them to this input system. Further, such an input system may also be used by hardcore gamers who want to build their own customized control rigs.

Figure 1:
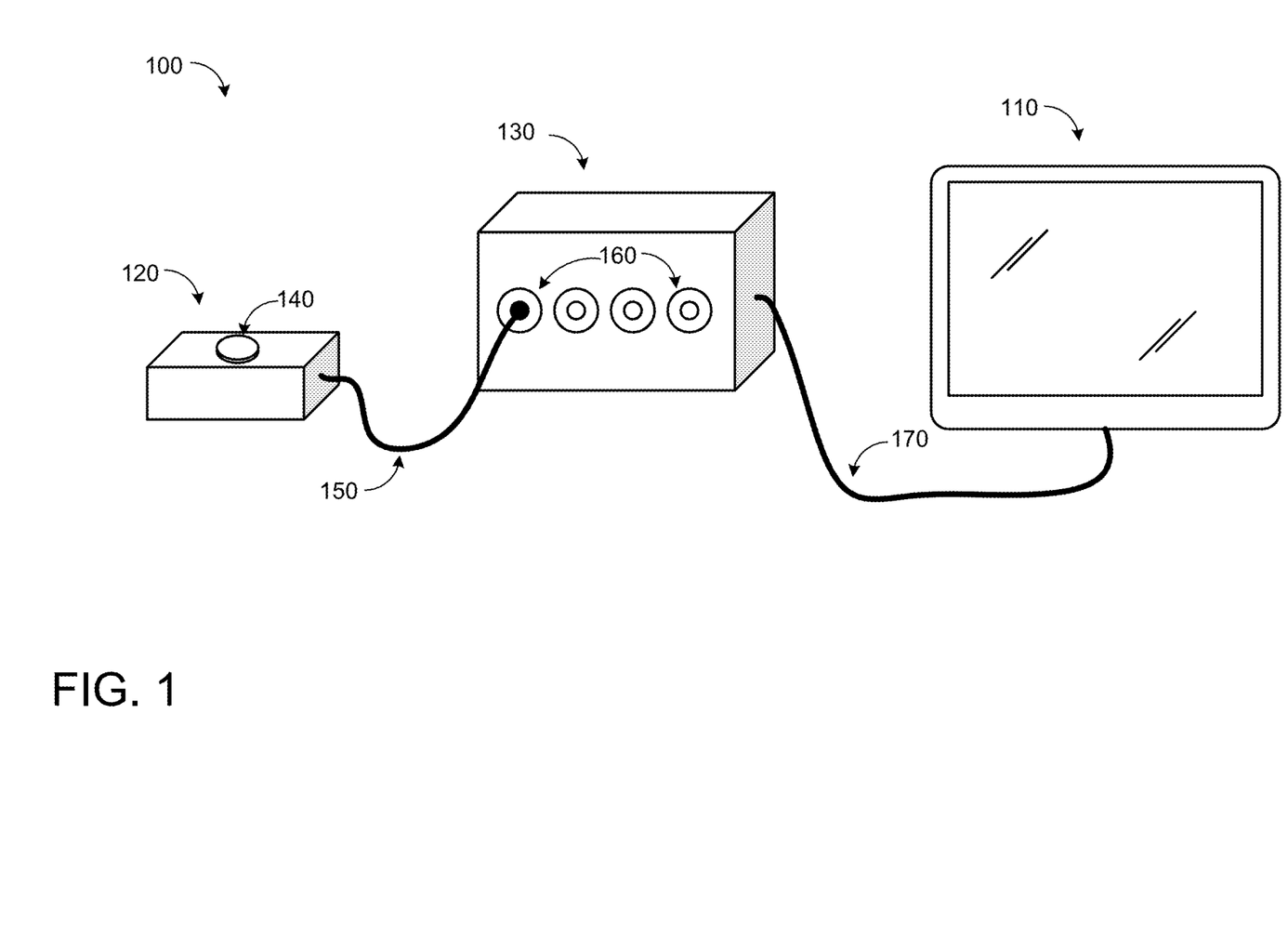
FIG. 1 schematically shows a control system for a computing device.

FIG. 1 schematically shows an example control system 100 for a computing device 110. Control system 100 includes control device 120 and computing device input system 130. Control device 120 may include one or more actuatable input mechanisms 140, and may further include one or more outputs 150. Actuatable input mechanisms 140 may include buttons, triggers, wheels, joysticks, near-field detectors, etc. Each actuatable input mechanism 140 may be electrically coupled to a specific output 150. Control device 120 may output digital and/or analog signals. For example, buttons may be configured to drive a digital signal while triggers and joysticks may be configured to drive an analog signal.

Computing device input system 130 may include a plurality of inputs 160 that may be configured to receive a corresponding control device connector coupled to outputs 150. Computing device input system 130 is shown with four inputs 160, but more or fewer may be included in other examples. Inputs 160 may include identical input ports, or may include different input ports that are configured to interact with certain subsets of actuatable input mechanisms 140.

Herein, examples of outputs 150 and inputs 160 are described with regard to 3.5 mm connectors and input ports. However, other compatible input ports and connectors may also be used, such as 7 mm, USB, D-Sub connectors, D-Shell connectors, RJ 14 connectors, RJ 45 connectors, etc. provided the output connector includes a minimum number of conductor paths and/or contact points (e.g., two for a digital input mechanism, three for a trigger input mechanism, four for a thumbstick input mechanism).

Computing device input system 130 may be configured to receive information via the output voltages indicated by outputs 150. In this way, computing device input system 130 and control device 120 do not need to share a protocol, as per USB and other similar connectors. In this way, output 150 provides an interpretable set of analog characteristics than can be interpreted at computing device input system 130. As such, a USB input may be used to transfer analog voltage signals via the USB connector pins.

Computing device input system 130 may be coupled to computing device 110 via digital output 170. In this way, control device 120 and computing device input system 130 may be used as a HID for computing device 110. Digital output 170 may be any suitable digital output, such as USB, IDE, SATA, eSATA, firewire, lightning, ethernet, etc., as well as wireless technologies such as Bluetooth or Wi-Fi. Computing device 110 may be a gaming console, a personal computer, a device control interface (e.g., wheelchair control), etc.

Each input 160 may be configured to have multiple functions, and configured so that computing device input system 130 may automatically determine whether a connector is engaged with that input, automatically distinguish between different types of connected controls, and automatically determine a state of a connected control device. For example, generic TRS/TRRS connectors that are normally used for audio may be provided with features to distinguish buttons from potentiometers, etc. and/or to determine a status and/or position of such a connected actuatable input mechanism.

Figure 2:
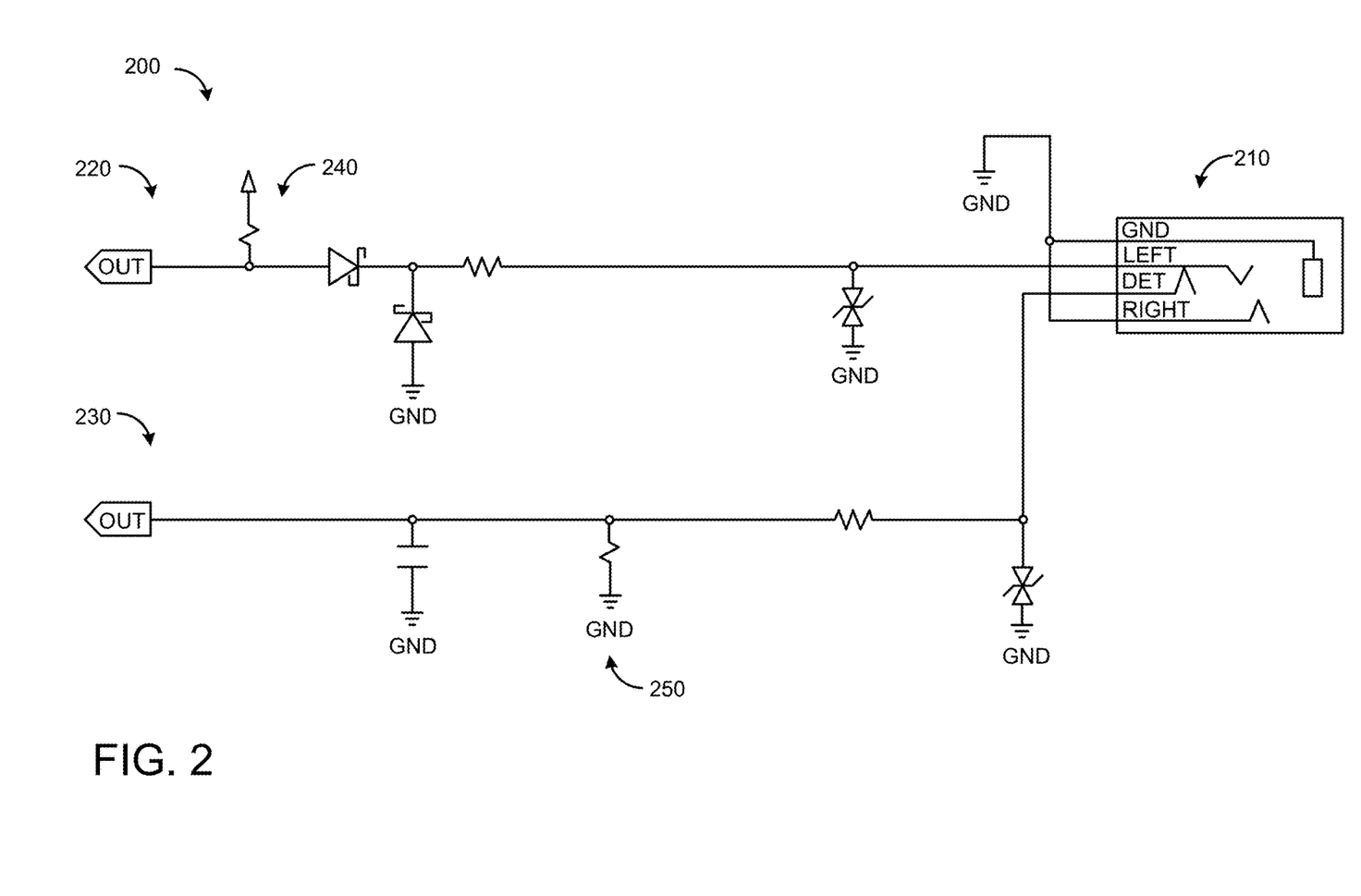
FIG. 2 schematically shows an example circuit for a digital input port.

In some examples, digital input connectors may be used to convey signals from a control device to a computing device input system. FIG. 2 shows an example an example circuit 200 for a digital input port 210. In this example, digital input port 210 is configured as a TRS connector having left, right, ground, and detect pins. Circuit 200 includes an upper circuit 220 and a lower circuit 230 (with reference to FIG. 2, rather than any particular orientation during use). Upper circuit 220 may act as a logic detection circuit, while lower circuit 230 may act as a plugged/unplugged detection circuit. Upper circuit 220 and lower circuit 230 may be configured as GPIO, ADC inputs, or any other suitable inputs. If ADC inputs are used, software, firmware, or hardware circuitry may convert the inputs to digital signals by determining appropriate voltage thresholds. Lower circuit 230 may function to detect whether a connector is plugged into input port 210. Upper circuit 220 may function to measure the state of the connected control device 120.

In this example, the detect pin is coupled to the left pin when no input connector is present through a normally-closed switch. In this conformation, pullup resistor 240 (e.g., connected to a ~3.3V voltage rail), pulls all the way through to pull-down resistor 250, which is pulled down by ground. However, because resistor 240 is much stronger than resistor 250, the signal is pulled up. In this conformation, lower circuit 230 sees a logic-HIGH value.

When an input connector is present, the detect/left short is broken, sending the lower pin to ground. Lower circuit 230 sees a logic-LOW value. Thus, lower circuit 230 may output a detect signal that goes to a microcontroller that indicates whether a connector is plugged into digital input port 210. Firmware (or, in other examples, hardware or software logic) will not sample the signal port (upper circuit 220) unless a plugged-in status is confirmed by lower circuit 230. The illustrated diodes, resistors, & ESD diodes function as electrical protection circuitry to protect the circuit from overvoltage events, ESD events, etc. such as the case where an incompatible device is plugged into input port 210.

Pullup resistor 240 may be configured to be stronger than pulldown resistor 250 to help achieve this functionality. The resistance values may be set to achieve the logic-HIGH and logic-LOW signals. As shown, circuit 200 is essentially a voltage divider circuit. As such, when the detect and left pins are coupled (e.g., shorted together), the ratio of the voltage divider provides the logic-HIGH signal. When the pins are decoupled and the short is broken, the pulldown resistor goes to ground, providing the logic-LOW signal.

As an example, a firmware algorithm may include three stages—connector detection, polarity detection, and monitoring and reporting. For connector detection, the firmware may wait for lower circuit 230 to read low for a duration, such as 750 ms. This provides the user time to fully insert the connector into the input and allows the hardware to settle to a stable state before the firmware begins reading the digital control state.

Input devices communicate state information by shorting or opening an electrical connection between the left pin and the ground pin. For polarity detection, the firmware may sample the state of upper circuit 220 to determine its polarity (by assuming the digital control is not initially actuated). If the signal is high, the firmware may assume that the input device is normally open (high=unactuated, low=actuated). If the signal is low, the firmware may assume that the input device is normally closed (low=unactuated, high=actuated). Alternatively, the firmware may assume the polarity based on one or more other factors, or may query the user to provide polarity information via configuration reports.

For monitoring and reporting, the firmware may sample upper circuit 230 periodically to act on the digital control input state. The firmware may convert the digital input state into an actuated vs unactuated state using the determined polarity. The firmware may report the actuation state to one or more applications for processing. Monitoring may further include switch debounce, filtering, and/or hysteresis algorithms to increase accuracy and meet latency targets.

Figure 3A:
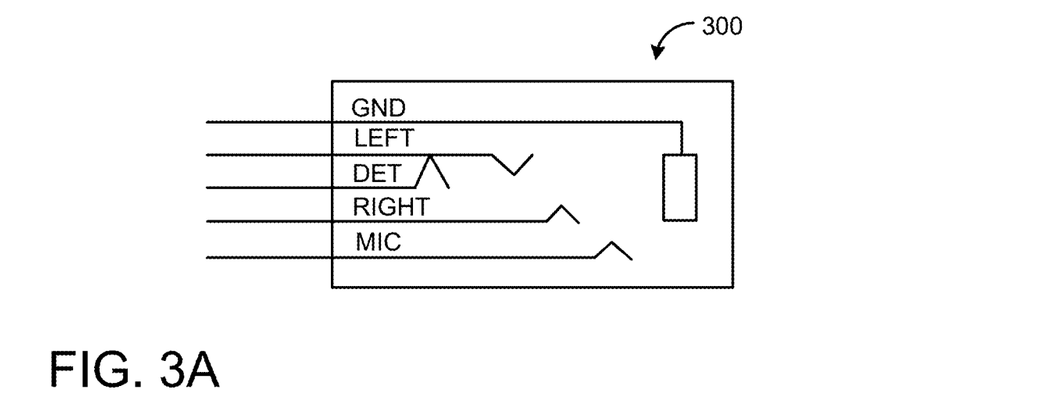
FIG. 3A schematically shows an example analog connector.

In other examples, analog control device connectors may be used to convey analog voltage signals from a control device to a computing device input system. FIG. 3A schematically shows an example analog input 300. As an example, analog input 300 may be a 4 pin, 3.5 mm stereo input (TRRS) with an internal switch for plugged-in/unplugged detection. Such analog inputs may be used for conveying signals from analog triggers, analog joysticks, buttons, etc.

Figure 3B:
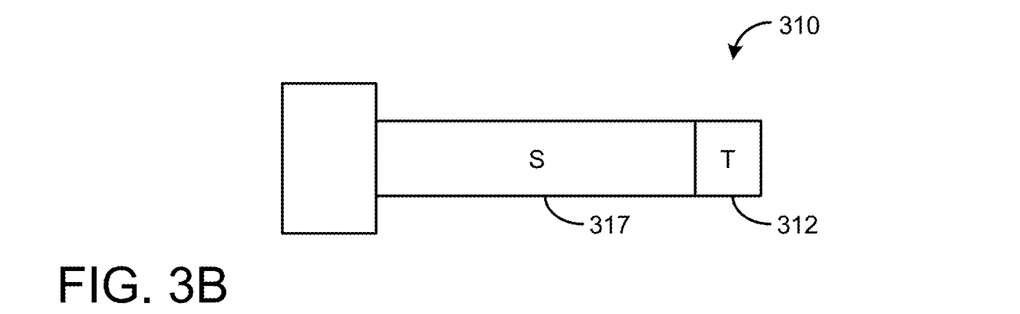
FIG. 3B schematically shows an example mono headphone connector.
Figure 3C:
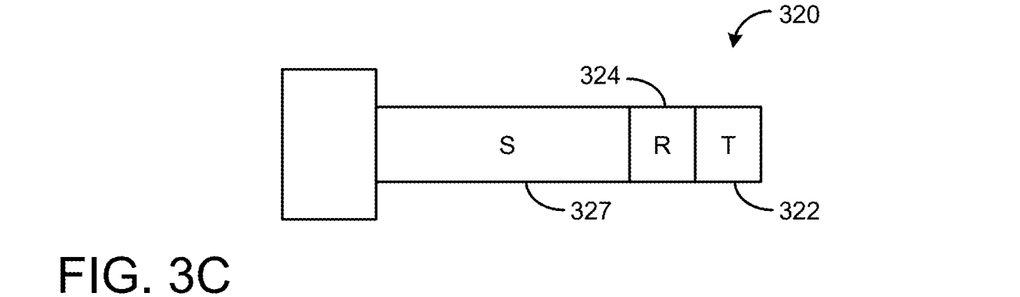
FIG. 3C schematically shows an example stereo headphone connector.
Figure 3D:
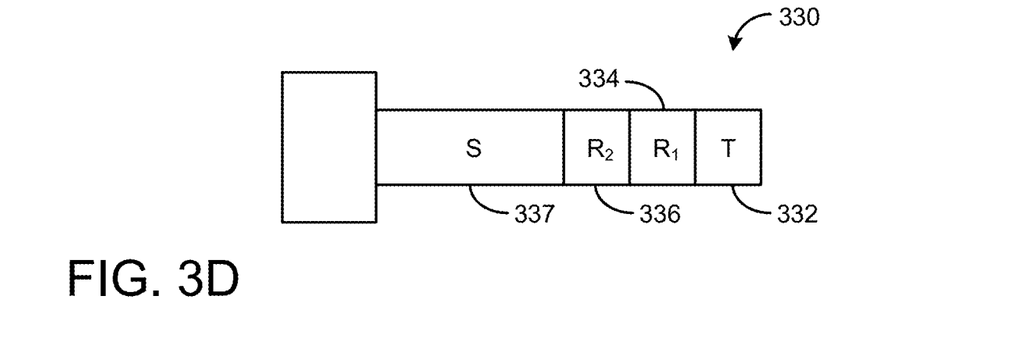
FIG. 3D schematically shows an example stereo headphone connector with a microphone input.

Various analog control device connectors may be used to interface with such an analog input. FIG. 3B schematically shows an example mono headphone connector 310, or TS connector. Conventionally, tip (T) 312 may convey audio signals, while sleeve (S) 317 may be a ground return. FIG. 3C schematically shows an example stereo headphone connector 320, or TRS connector. Conventionally, the tip (T) 322 may convey a left audio channel, the ring (R) 324 may convey a right audio channel, and the sleeve (S) 327 may be a ground return. FIG. 3D schematically shows an example stereo headphone connector with microphone 330. Conventionally, the tip (T) 332 may convey a left audio channel, the first ring (R1) 334 may convey a right audio channel, the second ring (R2) 336 may be a ground return, and the sleeve (S) 337 may convey a microphone signal. Such a pinout arrangement follows the AHJ/CTIA standard, but other arrangements may additionally or alternatively be used, such as OMTP.

Figure 4A:
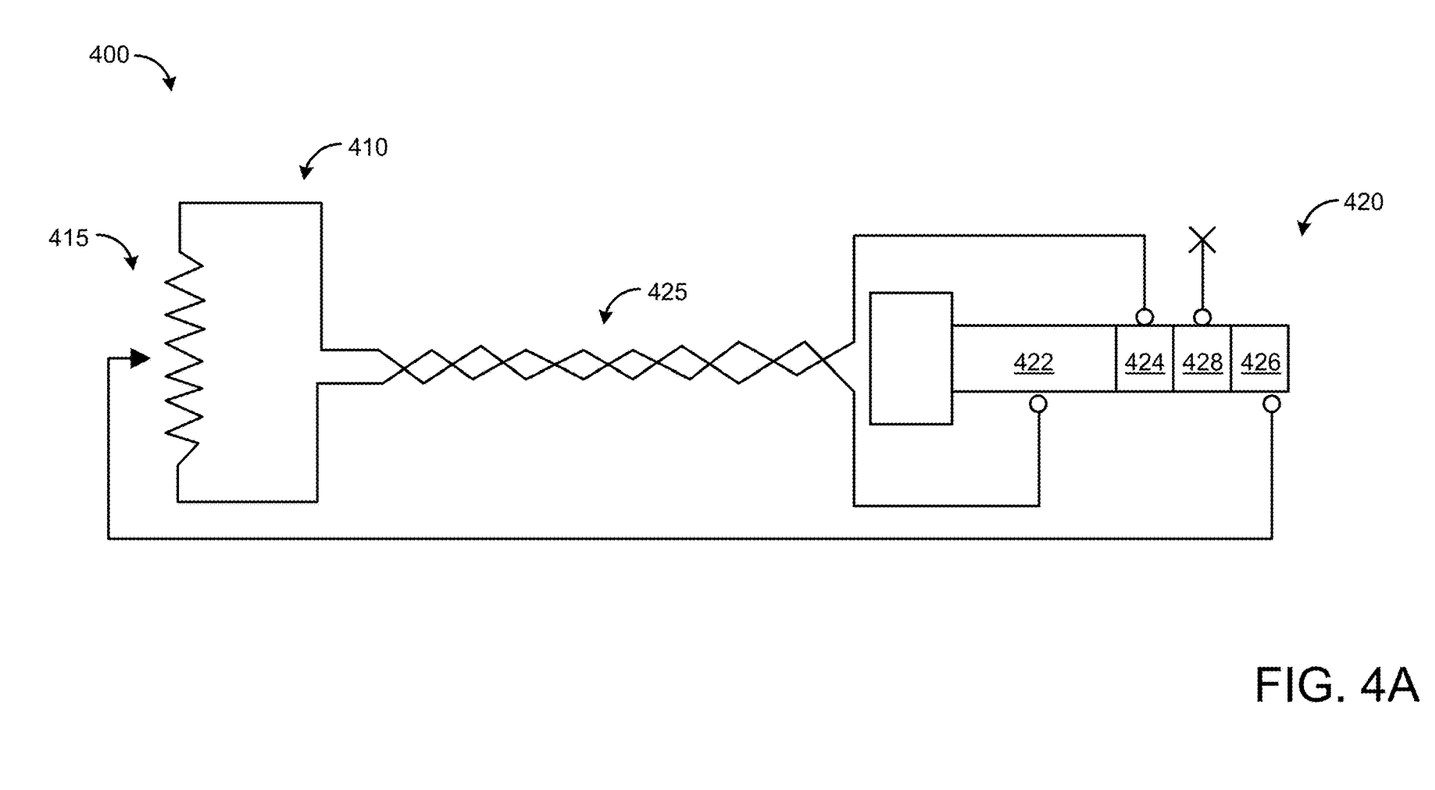
FIG. 4A schematically shows an example wiring configuration for an analog trigger.

TRRS connectors may be wired in other ways so as to convey multiple isolated analog voltage signals. FIG. 4A schematically shows a wiring configuration 400 for an analog trigger having one potentiometer. Potentiometer 410 may include an adjustable variable resistor 415 with any suitable maximal resistance value. As a non-limiting example, a 10 KOhm resistor may be used. Potentiometer 410 is wired to TRRS connector 420. The leads of potentiometer 410 are coupled to sleeve (S) 422 and R2 pin 424 via cable 425. The wiper of potentiometer 410 is wired to tip (T) 426. The T pin 426 thus represents analog movement. The R1 pin 428 is unused, R2 pin 424 is grounded via a series resistor, and sleeve 422 is a power supply voltage ($V_{CC}$) via a series resistor. As the trigger is scrolled up and down, moving potentiometer 410, an ADC converter in the interface microcontroller is able to read those values. At the input, analog voltage is received based on the potentiometer position. That value is transmitted to the ADC in the microcontroller, thus digitizing the analog signal into a digital representation by converting the voltage into a numeric value.

Figure 4B:
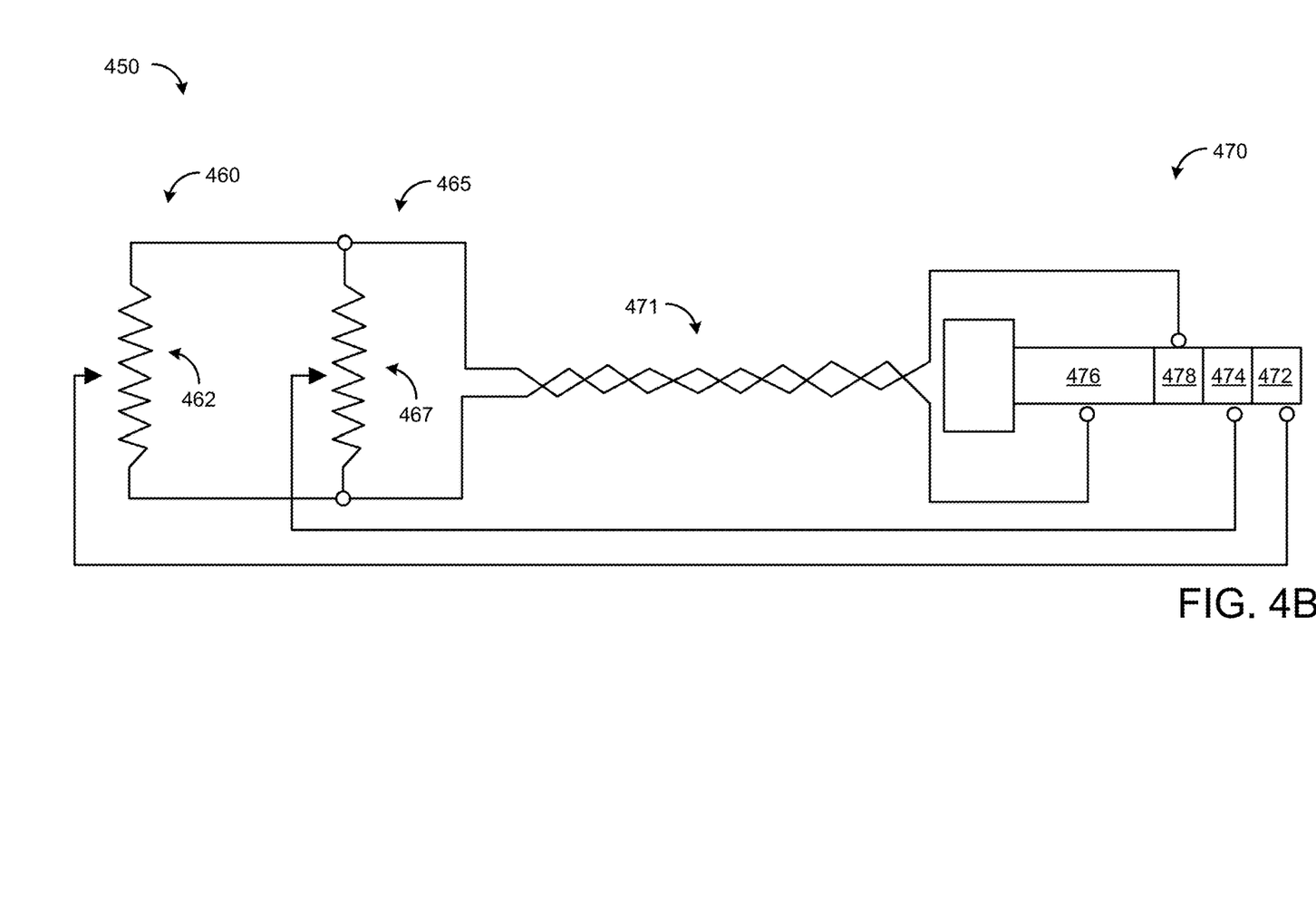
FIG. 4B schematically shows an example wiring configuration for an analog joystick.

FIG. 4B schematically shows a wiring configuration 450 for an analog joystick having two potentiometers. Potentiometer 460 includes adjustable variable resistor 462, and potentiometer 465 includes adjustable variable resistor 467. Resistors 462 and 465 may have equivalent values, such as 10 KOhm, or may have different values. Potentiometers 460 and 465 are wired to TRRS connector 470 via cable 471. The wiper of potentiometer 460 is wired to tip (T) 472 of connector 470. The wiper of potentiometer 465 is wired to R1 pin 474 of connector 470. Both potentiometers 460 and 465 are wired to sleeve (S) 476 and R2 pin 478. Tip (T) 472 may thus represent X-Axis movement, while R1 pin 474 may represent Y-Axis movement. R2 pin 478 is ground via a series resistor, and the sleeve (S) 476 is a power supply voltage ($V_{CC}$) via a series resistor.

Connectors comprising wiring configurations 400 and 450 may be plugged into inputs that are specifically configured, or may be plugged into inputs configured to accept both wiring configurations 400 and 450. In such an example, a user may provide a configuration command to distinguish the two configurations, and/or firmware may detect the separate devices (e.g., via a weak pull-down resistor that would yield a detectable signal when overpowered by a joystick, but would be pulled to ground by an unconnected input).

Figure 5:
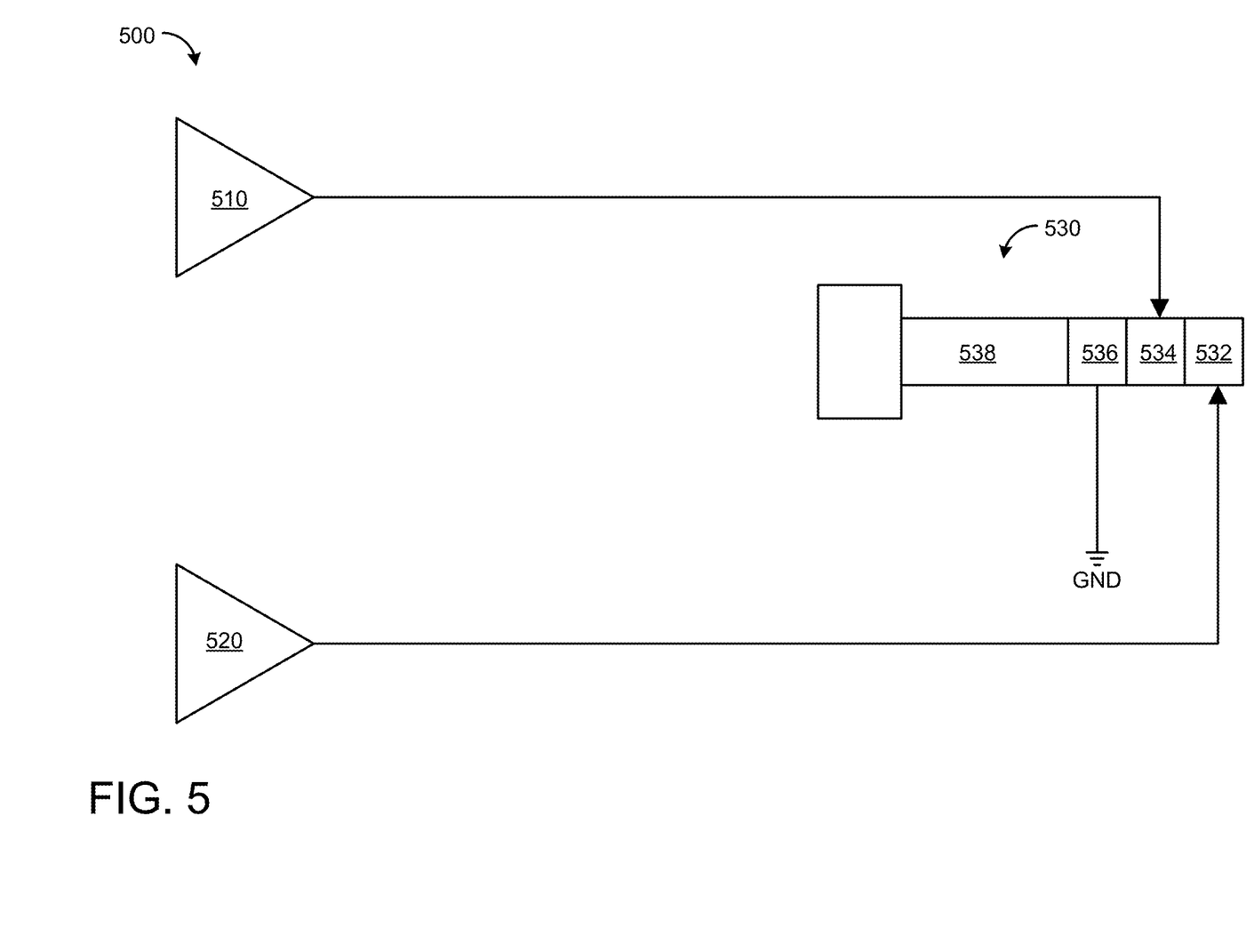
FIG. 5 schematically shows an example wiring configuration for an analog joystick with active voltage drivers.

FIG. 5 schematically shows a wiring configuration 500 for an analog joystick having active voltage drivers. Active voltage drivers include X-Axis driver 510 and Y-Axis driver 520. X-Axis driver 510 and Y-Axis driver 520 are wired to TRRS connector 530. X-Axis driver 510 is wired to tip (T) 532 of connector 530. Y-Axis driver 520 is wired to R1 pin 534 of connector 530. R2 pin 536 is ground via a series resistor, and the Sleeve (S) 538 may deliver the voltage used by the active drivers as an upper threshold. Though described for a joystick, active drive triggers and buttons may also be used via proper wiring configurations.

Figure 6:
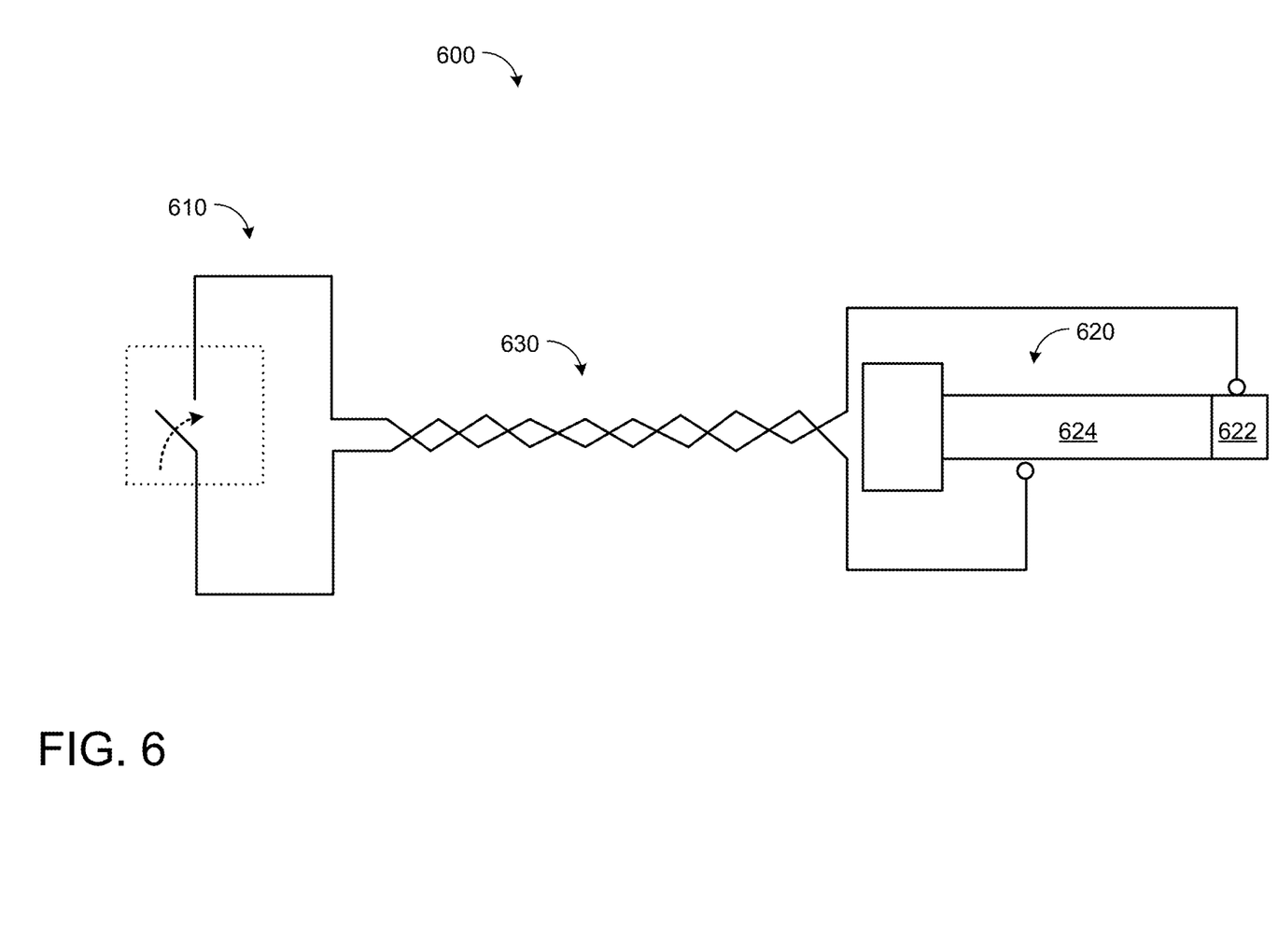
FIG. 6 schematically shows an example configuration for a normally open switch.

FIG. 6 schematically shows a wiring configuration 600 for a normally open switch 610, such as a button. For normally open switch 610 to work, TS connector 620 may be used. In this example, switch 610 is coupled to tip (T) 622 and sleeve (S) 624 via cable 630. If a TRS connector is used, then the R1 pin and Sleeve (S) need to be shorted together. If a TRRS connector is used, then the R1 pin, R2 pin, and sleeve (S) need to be shorted together.

For multi-purpose input ports, the input port circuitry may be configured such that an approximately linear response may be achieved on each analog output. Each input port may include a detect circuit coupled to a GPIO or ADC indicating whether a connector is plugged in (or unplugged from) the input port, wherein a first logic status (one of HIGH and LOW) indicates a plugged-in status, and a second logic status (the other of HIGH and LOW) indicates an unplugged status. Each input port may include a diode clamping circuit used to protect the input ports from excessive voltage. Data output by each ADC may be analyzed and processed by the firmware by utilizing switch debounce, filtering, and/or hysteresis algorithms to allow for a good user response.

Figure 7:
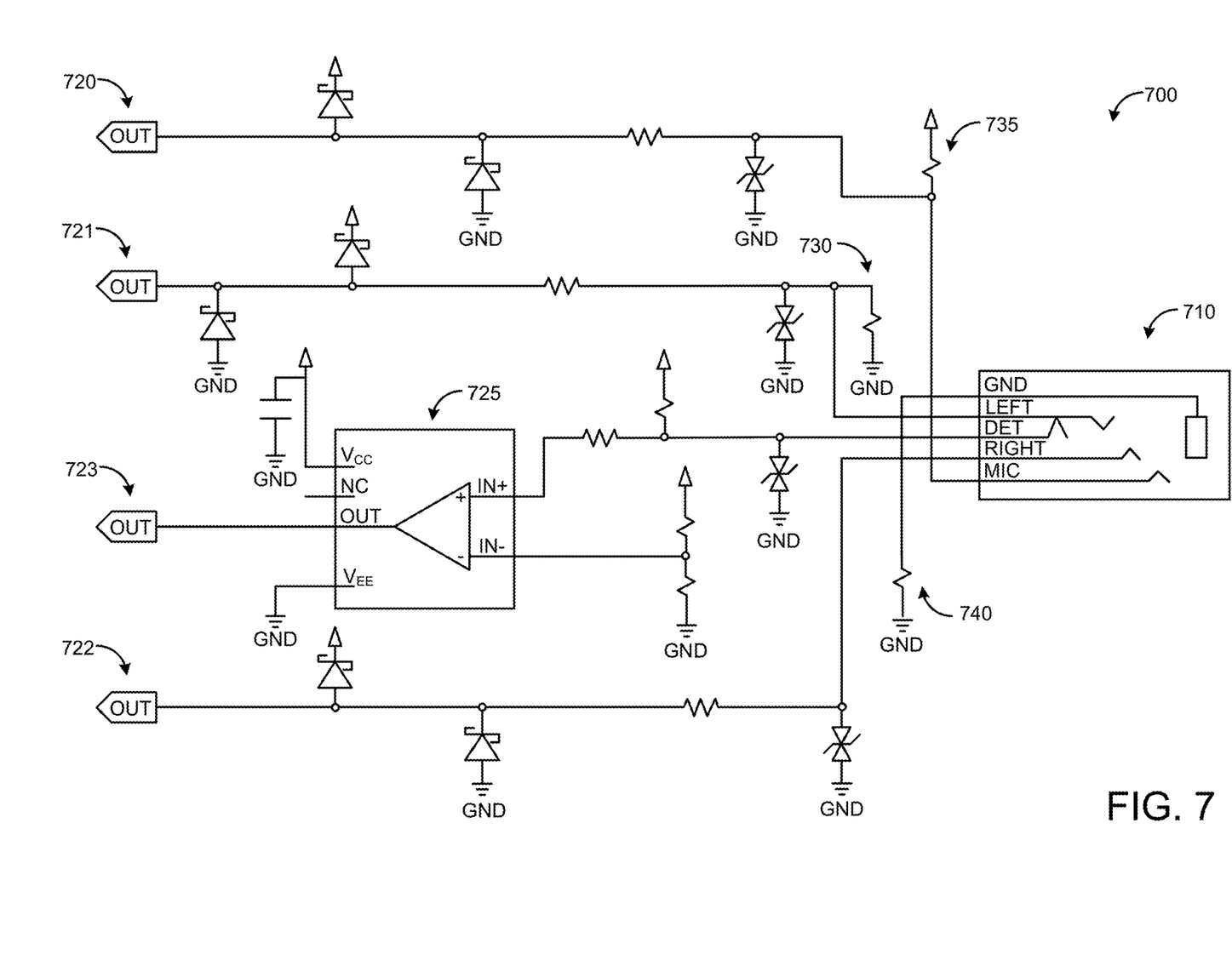
FIG. 7 schematically shows an example circuit for an analog joystick port.

As an example, FIG. 7 shows an example circuit 700 for an analog joystick port. Circuit 700 enables the implementation of a 2D joystick axis, such as an analog joystick having the wiring configuration described with regard to FIG. 4B, and/or an analog joystick with analog voltage drivers having the wiring configuration described with regard to FIG. 5. Circuit 700 includes the additional feature of autodetecting whether a TS or TRRS connector is plugged into input port 710. Circuit 700 includes four outputs: ADCs 720, 721, and 722, and GPIO 723. In this implementation, GPIO 723 indicates whether an input connector is plugged into input port 710. ADC 720 indicates what type of input device is coupled to the input connector (e.g., digital or analog input control), and ADCs 721 and 722 indicate potentiometer values (e.g., X and Y for an analog joystick) or button state (e.g., for a digital button).

GPIO 723 may be used to determine if a connector is coupled to input port 710. Comparator 725 may be used instead of the resister/divider pair shown in FIG. 2 due to the loading effects of pullup/pulldown resistors. Certain voltages will be received at comparator 725 depending on the plugged-in/unplugged status at input port 710. The output of comparator 725 will thus switch high or low based upon the plugged-in/unplugged status. Firmware or other suitable logic may read the state of GPIO 723 to determine connector presence or absence.

In this example, the voltage at ADC 720 will be $V_{CC}/2$ when a TS connector is present, as the MIC and GND pins become shorted together. The voltage at ADC 720 will be equal to $V_{CC}$ when a TRRS connector is present. For example, if a TS connector coupled to a normally open button (such as described with regard to FIG. 6) is plugged into port 710, ADC 720 reads MID (0.9), as the Mic, Ground, and Right pins are all shorted together in the connector. In this example, ADC 721 will switch between reading GND (when the button is open) to reading $V_{CC}/2$ (when the button is closed). If a TRRS connector coupled to an analog joystick is plugged into port 710, ADC 720 reads HIGH (1.8), and ADCs 721 and 722 read voltages that are based on joystick position values.

Grounding resistor 730, coupled to ADC 721, allows port 710 to accept both TS and TRRS connectors and to accurately detect the state of both types of input devices. Port 710 supports both normally open and normally closed buttons that can be actuated. TS connectors have an isolated left pin, with ground, right, and mic pins shorted together. Actuation for normally open buttons causes the left pin (T) to be shorted to the ground pin (S). If the button is not actuated, the circuit remains open. Actuation for normally closed buttons causes the left pin (T) to be isolated from the ground pin (S). If the button is not actuated, the left pin (T) will remain shorted to the ground pin (S). When shorted to ground, the ground pin is set to middle voltage via the voltage divider between pullup resistor 735 (coupled to MIC) and grounding resistor 740 (coupled to GND). The resulting voltage is predominant on ADC 721. When the button is released, the left pin is opened, and grounding resistor 730 pulls it down. In other words, in one state the voltage at ADC 721 is middle voltage. In another state, the voltage is based on grounding resistor 730. Grounding resistor 730 helps to determine the button state, but may introduce non-linearity for a thumbstick. Thus, the value of grounding resistor 730 may be selected to obtain a good button response while maintaining a suitable degree of linearity.

ADC 721 is thus coupled to the positive rail of comparator 725 for plugged/unplugged detection, determination of TS vs TRRS connector type, and is used for either determining a button status or for indicating the X direction of a joystick. Grounding resistor 730 enables this function overload of ADC 721.

Figure 8:
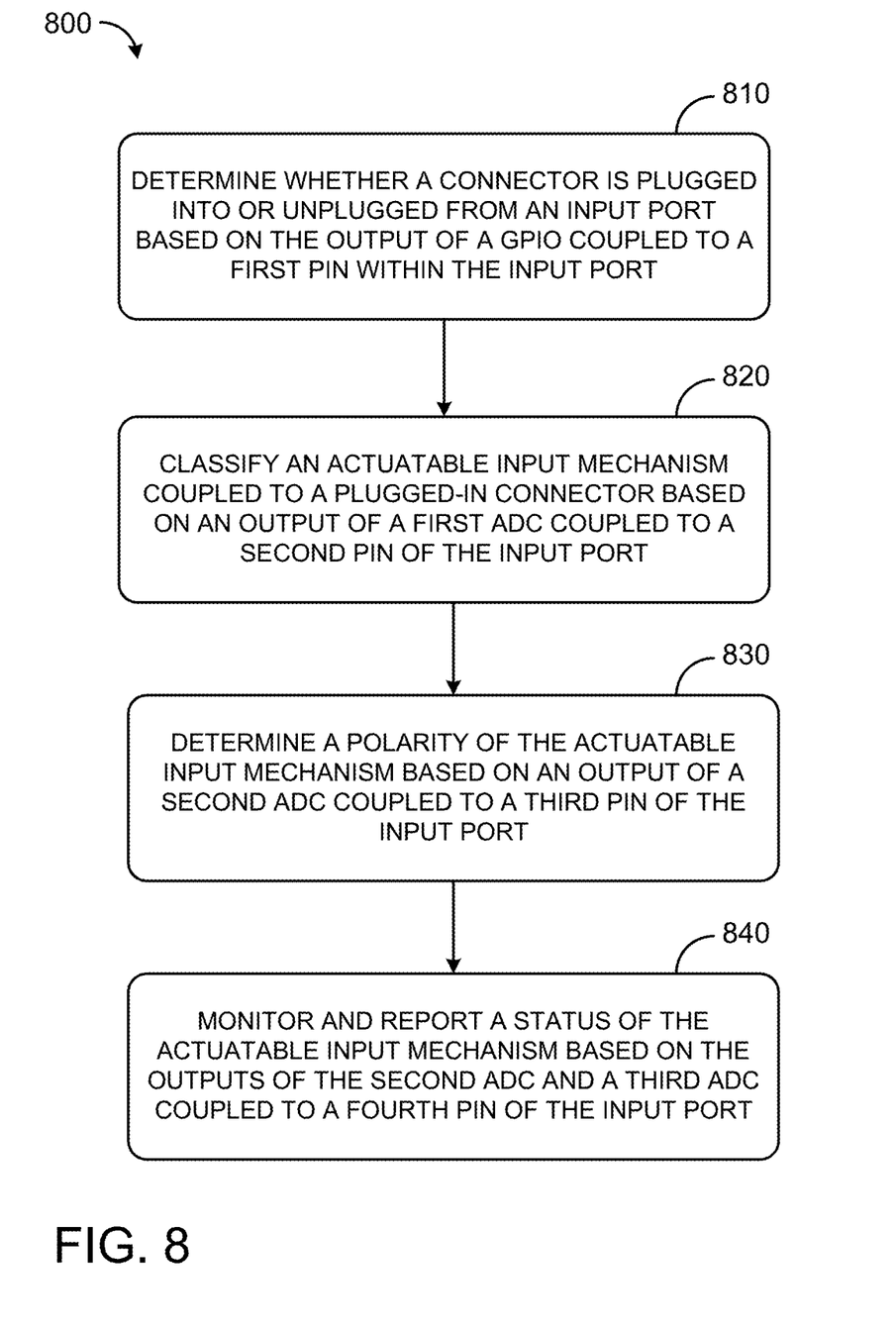
FIG. 8 shows an example method for processing analog voltage signals received at an input port.

FIG. 8 shows a flow chart depicting an example method 800 for processing analog voltage signals received at an input port of a computing device input system, such as input port 710. Method 800 may be enacted by firmware for a computing device input system, such as the computing device input system described with regard to FIG. 1, or via any other suitable logic implementation. As described with regard to FIG. 7, method 800 may be applied to an input port that includes three ADC analog inputs, and one GPIO input. The GPIO input may be either a digital GPIO or an analog ADC measurement. If it is analog, the method may include converting the GPIO output into a digital signal based on appropriate voltage thresholds. Method 800 may enable the interpretation of signals from an analog joystick wired to a TRRS connector, as described with regard to FIGS. 4B and 5.

At 810, method 800 includes determining whether a connector is plugged into or unplugged from an input port based on the output of a GPIO coupled to a detect pin within an input port (e.g., GPIO 723). For connector detection, the firmware may wait for the GPIO to read high for a duration, such as 750 ms. This provides the user time to fully insert the plug and allows the hardware to settle to a stable state before the firmware begins reading the digital control state.

At 820, method 800 includes classifying an actuatable input mechanism coupled to a plugged-in connector based on an output of a first ADC coupled to the mic pin of the input port (e.g., ADC 720). If the voltage is within a threshold of $V_{CC}$, the input mechanism may be classified as an analog joystick control. If the voltage is near $V_{CC}/2$, the input mechanism may be classified as a digital control (e.g., button).

At 830, method 800 includes determining a polarity of the actuatable input mechanism based on an output of a second ADC coupled to the left pin of the input port (e.g., ADC 721). For input mechanisms classified as digital controls, the firmware may sample the second ADC input to determine its polarity, which may include assuming the digital control is not actuated initially. If the sampled signal is low, the firmware may assume the input mechanism is normally open (low=unactuated, $V_{CC}/2$=actuated). If the sampled signal is near $V_{CC}/2$, the firmware may assume the input device is normally closed ($V_{CC}/2$=unactuated, low=actuated). Alternatively, the firmware may assume the polarity based on one or more additional factors, or may query the user to provide polarity information via configuration reports.

At 840, method 800 includes monitoring and reporting a status of the actuatable input mechanism based on the outputs of the second ADC and a third ADC coupled to the right pin of the input port (e.g., ADC 722). For example, the firmware may sample the left and right channel ADC inputs periodically to act on the control's input state. For analog controls, the firmware may interpret the value from the second ADC as the X-axis position, and the value from the third ADC as the Y-axis position. Dynamic range, linearity, and deadzones can be handled via specification or via calibration. Any joystick position changes may be reported to an application for action. For digital controls, the digital input state may be converted into an actuated vs unactuated state based on the results from polarity detection. The actuation state may be reported to an application for processing. Additional monitoring may include standard switch debouncing, filtering, or hysteresis algorithms to increase accuracy and meet latency targets.

Figure 9:
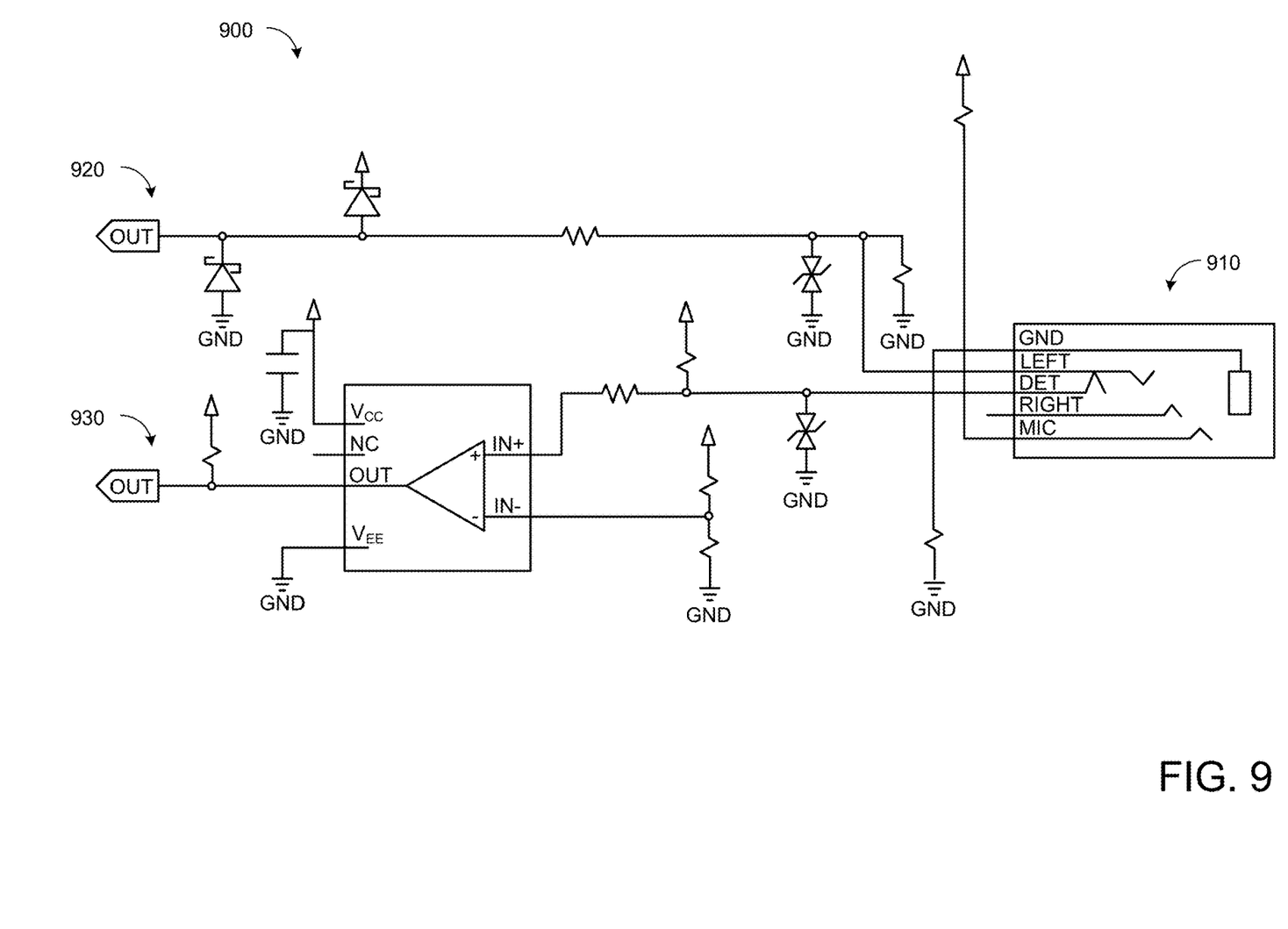
FIG. 9 schematically shows an example circuit for an analog trigger port.

FIG. 9 shows an example circuit 900 for an analog trigger port. Circuit 900 may be considered to be a subset of circuit 700. Circuit 900 includes input port 910, ADC 920, and GPIO 930. GPIO 930 may indicate whether a connector is plugged into input port 910. ADC 920 may indicate a position of the analog trigger. ADC 920 may include other features in some examples. When operating in a TS switch mode, ADC 920 may switch between reading GND (Open) to $V_{CC}/2$ (Closed). In other modes, ADC 920 may provide an approximately linear input proportionate to the position of a potentiometer coupled to input port 910. ADC 920 may be an analog ADC input, while GPIO 930 may be either a digital GPIO or an analog ADC input. If it is analog, firmware may be used to convert the input to a digital signal by determining appropriate voltage thresholds.

A firmware algorithm may include two stages: plug detection, and monitoring and reporting. As described with regard to FIG. 8, connector detection may wait for GPIO 930 to read high for a duration, such as 750 ms. This provides the user time to fully insert the plug and allows the hardware to settle to a stable state before the firmware begins reading the digital control state.

For monitoring and reporting, the firmware may sample ADC 920 periodically to act on the control's input state. The value at ADC 920 may be interpreted as trigger position. Dynamic range, linearity, and deadzones can be handled via specification or via calibration. Any trigger position changes may be reported to an application for action. This firmware method may work with both analog triggers as well as digital switches. Digital switches may function similarly to a single-channel potentiometer-based trigger, excepting that the dynamic range may differ. Any differences in dynamic range may be handled by the calibration or specification process.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
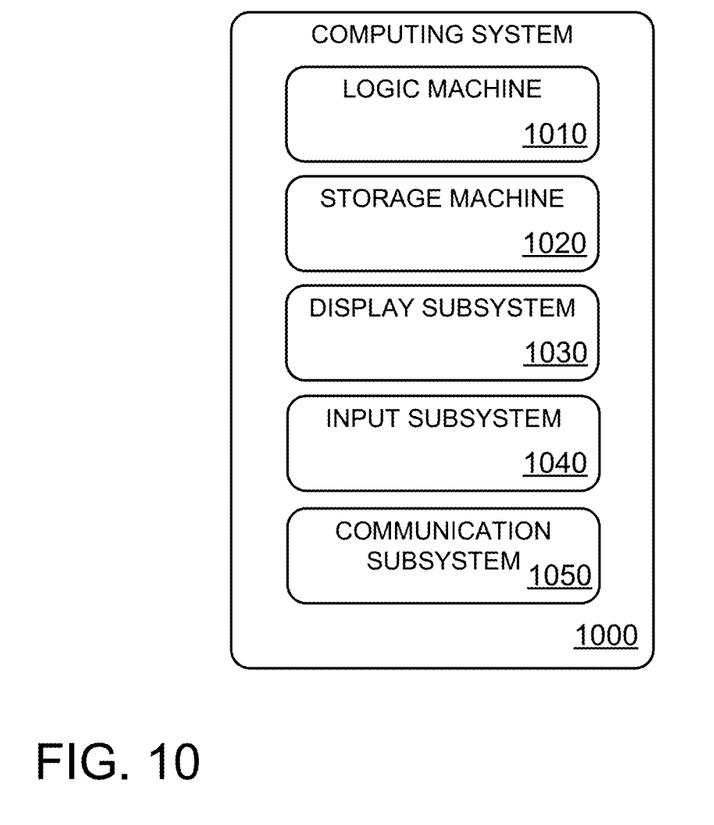
FIG. 10 schematically shows an example computing system.

FIG. 10 schematically shows a non-limiting embodiment of a computing system 1000 that can enact one or more of the methods and processes described above. Computing system 1000 is shown in simplified form. Computing system 1000 may take the form of one or more personal computers, server computers, tablet computers, home-entertainment computers, network computing devices, gaming devices, mobile computing devices, mobile communication devices (e.g., smart phone), and/or other computing devices.

Computing system 1000 includes a logic machine 1010 and a storage machine 1020. Computing system 1000 may optionally include a display subsystem 1030, input subsystem 1040, communication subsystem 1050, and/or other components not shown in FIG. 10.

Logic machine 1010 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1020 includes one or more physical devices configured to hold instructions executable by the logic machine to implement the methods and processes described herein. When such methods and processes are implemented, the state of storage machine 1020 may be transformed—e.g., to hold different data.

Storage machine 1020 may include removable and/or built-in devices. Storage machine 1020 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1020 may include volatile, nonvolatile, dynamic, static, read/write, read-only, random-access, sequential-access, location-addressable, file-addressable, and/or content-addressable devices.

It will be appreciated that storage machine 1020 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1010 and storage machine 1020 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1030 may be used to present a visual representation of data held by storage machine 1020. This visual representation may take the form of a graphical user interface (GUI). As the herein described methods and processes change the data held by the storage machine, and thus transform the state of the storage machine, the state of display subsystem 1030 may likewise be transformed to visually represent changes in the underlying data. Display subsystem 1030 may include one or more display devices utilizing virtually any type of technology. Such display devices may be combined with logic machine 1010 and/or storage machine 1020 in a shared enclosure, or such display devices may be peripheral display devices.

When included, input subsystem 1040 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1050 may be configured to communicatively couple computing system 1000 with one or more other computing devices. Communication subsystem 1050 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1000 to send and/or receive messages to and/or from other devices via a network such as the Internet.

In another example, a computing device input system comprises an input configured to receive a connection to a control device connector comprising a plurality of conductors; and circuitry configured to determine a presence, type, and state of a control device in communication with the control device connector based on analog voltages received from the control device connector. In such an example, or any other example, the control device connector may additionally or alternatively comprise an analog audio jack. In any of the preceding examples, or any other example, the control device may additionally or alternatively comprise one or more potentiometers. In any of the preceding examples, or any other example, the control device may additionally or alternatively comprise a switch. In any of the preceding examples, or any other example, the computing device input system may additionally or alternatively comprise a plurality of inputs. In any of the preceding examples, or any other example, the plurality of inputs may additionally or alternatively comprise an analog input and a digital input each comprising circuitry configured to determine a type of control device connected. In any of the preceding examples, or any other example, the control device connector may additionally or alternatively comprise one of a USB, RJ 14, and RJ 45 connector. In any of the preceding examples, or any other example, the computing device input system may additionally or alternatively be a video game controller system.

In another example, a computing device input system comprises an input port including ground, left, detect, right, and mic pins, the left pin and detect pin being shorted together in the absence of a plugged-in connector; a first analog-to-digital converter (ADC) coupled to the left pin; a general-purpose input/output (GPIO) coupled to the detect pin via a comparator; a pullup resistor coupled to the mic pin; a first grounding resistor coupled between the ground pin and ground; a second grounding resistor coupled between the left pin and ground; and a controller configured to receive voltages from the first ADC and the GPIO, and further configured to indicate a presence of a plugged-in connector based on a voltage received from the GPIO, and indicate a type of actuatable input mechanism coupled to the plugged-in connector based on a voltage received from the first ADC. In such an example, or any other example, the system may additionally or alternatively comprise a second ADC coupled to the mic pin; and the controller may additionally or alternatively be further configured to receive voltages from the second ADC, and indicate a type of actuatable input mechanism coupled to the plugged-in connector based on a voltage received from the second ADC. In any of the preceding examples, or any other example, the controller may additionally or alternatively be configured to indicate a type of actuatable input mechanism coupled to the plugged-in connector by indicating that a TS connector is plugged in to the input port based on receiving a voltage of $V_{CC}/2$ from the first ADC. In any of the preceding examples, or any other example, the controller may additionally or alternatively be configured to indicate that a button is in an open state based on receiving a voltage from the first ADC, the received voltage based on a voltage divider between the pull-up resistor and the first grounding resistor. In any of the preceding examples, or any other example, the controller may additionally or alternatively be configured to indicate that the button is in a closed state based on receiving a voltage from the first ADC, the received voltage based on a value of the second grounding resistor. In any of the preceding examples, or any other example, the controller may additionally or alternatively be further configured to indicate a type of actuatable input mechanism coupled to the plugged-in connector by indicating that a TRRS connector is plugged in to the input port based on receiving a voltage of $V_{CC}$ from the first ADC. In any of the preceding examples, or any other example, the system may additionally or alternatively comprise a third ADC coupled to the right pin, and the controller may additionally or alternatively be further configured to indicate X and Y potentiometer values based on voltages received from the second and third ADCs.

In yet another example, a method for processing analog voltage signals received at an input port of a computing device input system comprises: determining whether a connector is plugged into or unplugged from an input port based on the output of a GPIO coupled to a first pin within the input port; classifying an actuatable input mechanism coupled to a plugged-in connector based on an output of a first ADC coupled to a second pin of the input port; determining a polarity of the actuatable input mechanism based on an output of a second ADC coupled to a third pin of the input port; and monitoring and reporting a status of the actuatable input mechanism based on the outputs of the second ADC and a third ADC coupled to a fourth pin of the input port. In such an example, or any other example, determining whether a connector is plugged into or unplugged from an input port based on the output of a GPIO may additionally or alternatively comprise waiting for the GPIO to read a high voltage value for a predetermined duration. In any of the preceding examples, or any other example, classifying an actuatable input mechanism coupled to a plugged-in connector based on an output of the first ADC may additionally or alternatively include classifying the actuatable input mechanism as an analog joystick based on an output of the first ADC being within a threshold of $V_{CC}$; and classifying the actuatable input mechanism as a digital control based on an output of the first ADC being within a threshold of $V_{CC}/2$. In any of the preceding examples, or any other example, determining a polarity of the actuatable input mechanism based on an output of the second ADC may additionally or alternatively include indicating the actuatable input mechanism is normally closed based on an output of the second ADC being within a threshold of ground voltage; and indicating the actuatable input mechanism is normally open based on an output of the second ADC being within a threshold of $V_{CC}/2$. In any of the preceding examples, or any other example, monitoring and reporting a status of the actuatable input mechanism based on the outputs of the second ADC and the third ADC may additionally or alternatively include indicating an X-axis position of a joystick based on a voltage received from the second ADC; and indicating a Y-axis position of the joystick based on a voltage received from the third ADC.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device input system, comprising:
an input configured to receive a connection to a control device connector comprising a plurality of conductors, the input including at least a first pin coupled to an analog-to-digital converter (ADC), and a second pin coupled to a general-purpose input/output (GPIO); and
analog circuitry configured to:
determine a presence of the control device connector based on a first voltage received from the GPIO, and
distinguish between two or more different actuatable input mechanisms coupled to a plugged-in control device connector based on a second voltage received from the ADC.

2. The computing device input system of claim 1, wherein the control device connector comprises an analog audio jack.

3. The computing device input system of claim 1, wherein the actuatable input mechanism comprises one or more potentiometers.

4. The computing device input system of claim 1, wherein the actuatable input mechanism comprises a switch.

5. The computing device input system of claim 1, further comprising a plurality of inputs.

6. The computing device input system of claim 5, wherein the plurality of inputs comprises an analog input and a digital input each comprising circuitry configured to determine a type of actuatable input mechanism connected.

7. The computing device input system of claim 1, wherein the control device connector comprises one of a USB, RJ 14, and RJ 45 connector.

8. The computing device input system of claim 1, wherein the computing device input system is a video game controller system.

9. A computing device input system, comprising:
an input port including ground, left, detect, right, and mic pins, the left pin and detect pin being shorted together in the absence of a plugged-in connector;
a first analog-to-digital converter (ADC) coupled to the left pin;
a general-purpose input/output (GPIO) coupled to the detect pin via a comparator;
a pullup resistor coupled to the mic pin;
a first grounding resistor coupled between the ground pin and ground;
a second grounding resistor coupled between the left pin and ground; and
a controller configured to receive voltages from the first ADC and the GPIO, and further configured to
indicate a presence of a plugged-in connector based on a voltage received from the GPIO, and
indicate a type of actuatable input mechanism coupled to the plugged-in connector based on a first voltage received from the first ADC.

10. The system of claim 9, further comprising:
a second ADC coupled to the mic pin; and wherein the controller is further configured to
receive voltages from the second ADC, and
indicate the type of actuatable input mechanism coupled to the plugged-in connector based on a first voltage received from the second ADC.

11. The system of claim 10, wherein the controller is configured to indicate the type of actuatable input mechanism coupled to the plugged-in connector by indicating that a two-contact, tip-sleeve type connector is plugged in to the input port based on receiving a voltage of Vcc/2 from the first ADC.

12. The system of claim 11, wherein the controller is further configured to
indicate that a button is in an open state based on receiving a second voltage from the first ADC, the second received voltage based on a voltage divider between the pull-up resistor and the first grounding resistor.

13. The system of claim 12, wherein the controller is further configured to
indicate that the button is in a closed state based on receiving a third voltage from the first ADC, the third received voltage based on a value of the second grounding resistor.

14. The system of claim 10, wherein the controller is further configured to indicate the type of actuatable input mechanism coupled to the plugged-in connector by indicating that a four-contact, tip-ring-ring-sleeve type connector is plugged in to the input port based on receiving a voltage of Vcc from the first ADC.

15. The system of claim 14, further comprising a third ADC coupled to the right pin, and wherein the controller is further configured to indicate X and Y potentiometer values based on voltages received from the second and third ADCs.

16. A method for processing analog voltage signals received at an input port of a computing device input system, the method comprising:
determining whether a connector is plugged into or unplugged from the input port based on an output of a GPIO coupled to a first pin within the input port;
classifying an actuatable input mechanism coupled to a plugged-in connector based on an output of a first ADC coupled to a second pin of the input port;
determining a polarity of the actuatable input mechanism based on an output of a second ADC coupled to a third pin of the input port; and
monitoring and reporting a status of the actuatable input mechanism based on the outputs of the second ADC and a third ADC coupled to a fourth pin of the input port.

17. The method of claim 16, wherein determining whether the connector is plugged into or unplugged from the input port based on the output of the GPIO includes waiting for the GPIO to read a voltage value above a threshold for a predetermined duration.

18. The method of claim 16, wherein classifying the actuatable input mechanism coupled to the plugged-in connector based on the output of the first ADC includes
classifying the actuatable input mechanism as an analog joystick based on the output of the first ADC being within a threshold of Vcc; and
classifying the actuatable input mechanism as a digital control based on the output of the first ADC being within a threshold of Vcc/2.

19. The method of claim 16, wherein determining the polarity of the actuatable input mechanism based on the output of the second ADC includes
indicating the actuatable input mechanism is normally closed based on the output of the second ADC being within a threshold of ground voltage; and
indicating the actuatable input mechanism is normally open based on the output of the second ADC being within a threshold of Vcc/2.

20. The method of claim 16, wherein monitoring and reporting the status of the actuatable input mechanism based on the outputs of the second ADC and the third ADC includes
indicating an X-axis position of a joystick based on a voltage received from the second ADC; and
indicating a Y-axis position of the joystick based on a voltage received from the third ADC.

* * * * *